United States Patent
Kabeya et al.

(10) Patent No.: US 11,493,130 B2
(45) Date of Patent: Nov. 8, 2022

(54) HOLE PLUG

(71) Applicant: Nifco Inc., Yokosuka (JP)

(72) Inventors: Satoshi Kabeya, Kariya (JP); Takehiro Sato, Yokosuka (JP)

(73) Assignee: Nifco Inc., Yokosuka (JP)

( * ) Notice: Subject to any disclaimer, the term of this patent is extended or adjusted under 35 U.S.C. 154(b) by 177 days.

(21) Appl. No.: 16/957,789

(22) PCT Filed: Oct. 29, 2018

(86) PCT No.: PCT/JP2018/040191
§ 371 (c)(1),
(2) Date: Jun. 25, 2020

(87) PCT Pub. No.: WO2019/130793
PCT Pub. Date: Jul. 4, 2019

(65) Prior Publication Data
US 2021/0372523 A1 Dec. 2, 2021

(30) Foreign Application Priority Data
Dec. 27, 2017 (JP) .............................. JP2017-252223

(51) Int. Cl.
*F16J 13/14* (2006.01)
*B62D 25/24* (2006.01)

(52) U.S. Cl.
CPC ............. *F16J 13/14* (2013.01); *B62D 25/24* (2013.01)

(58) Field of Classification Search
CPC ................................. B62D 25/24; F16J 13/14
See application file for complete search history.

(56) References Cited

U.S. PATENT DOCUMENTS

2004/0057812 A1* 3/2004 Schaty .................. F16B 19/008
411/508
2014/0125081 A1* 5/2014 Pares Isanta .......... B62D 25/24
296/1.06
(Continued)

FOREIGN PATENT DOCUMENTS

| JP | 2001-124246 | 5/2001 |
| JP | 3881814 | 11/2006 |

(Continued)

OTHER PUBLICATIONS

International Search Report and the Written Opinion dated Nov. 27, 2018 From the International Searching Authority Re. Application No. PCT/JP2018/040191 and Its Translation of Search Report Into English. (9 Pages).

*Primary Examiner* — Eugene G Byrd (57) ABSTRACT

A hole plug includes: a tube-shaped outer peripheral wall configured to be inserted into an attachment hole formed in an attachment-target member; a blocking portion-close off the inside of the outer peripheral wall; a ring-shaped flange that juts out toward a radial direction outer side of the outer peripheral wall from an end portion of the outer peripheral wall on an opposite side from an insertion direction so as to cover a location surrounding the attachment hole; a hook portion engage with an edge of the attachment hole; and a plurality of recess portions that are formed at a front face of a base end portion of the flange at intervals around a circumferential direction of the flange, each of the recess portions including a bottom portion with a planar face profile or a curved face profile.

6 Claims, 8 Drawing Sheets

(56) References Cited

U.S. PATENT DOCUMENTS

2014/0311038 A1\* 10/2014 Iwahara ................. B62D 25/24
                                                        49/466
2016/0244104 A1\*  8/2016 Kuhm ................... B05C 21/005

FOREIGN PATENT DOCUMENTS

| JP | 2011121575 A | * | 6/2011 | ............ B62D 25/24 |
| JP | 2012241843 A | * | 12/2012 | ............... F16J 13/14 |
| JP | 2014-114850 | | 6/2014 | |
| JP | 2014114851 A | * | 6/2014 | ............... F16J 13/14 |
| JP | 2015081659 A | * | 4/2015 | ............ B62D 25/24 |
| WO | WO 2019/130793 | | 7/2019 | |

\* cited by examiner

HOLE PLUG

RELATED APPLICATIONS

This application is a National Phase of PCT Patent Application No. PCT/JP2018/040191 having International filing date of Oct. 29, 2018, which claims the benefit of priority of Japanese Patent Application No. 2017-252223 filed on Dec. 27, 2017. The contents of the above applications are all incorporated by reference as if fully set forth herein in their entirety.

FIELD AND BACKGROUND OF THE INVENTION

The present disclosure relates to a hole plug.

Japanese Patent No. 3881814 discloses a hole plug (grommet) that is attached to an attachment hole (hole) formed in an attachment-target member (floor panel). The hole plug includes a tube-shaped outer peripheral wall that is inserted into the attachment hole, a blocking portion that closes off the inside of the outer peripheral wall, and a ring-shaped flange (non-insertion portion) that juts out toward a radial direction outer side from an end portion of the outer peripheral wall on an opposite side from an insertion direction. Plural grooves (open notch grooves), each with a V-shaped cross-section that widens on progression from a leading end portion to a base end portion, are formed in a front face of the flange at intervals around a circumferential direction of the flange.

SUMMARY OF THE INVENTION

Technical Problem

During attachment of the hole plug disclosed in Japanese Patent No. 3881814 to the attachment-target member, the flange undergoes deformation originating at the grooves as the hole plug is pressed into the attachment hole, enabling the force required for insertion to be reduced. However, this deformation originating at the grooves is restricted if the walls of the grooves abut each other during the deformation of the flange, and so the advantageous effect of reducing the force required for insertion when pressing the hole plug into the attachment hole might not be sufficiently obtained.

In consideration of the above circumstances, an object of the present disclosure is to provide a hole plug capable of reducing the force required to insert the hole plug into an attachment hole formed in an attachment-target member.

Solution to Problem

A hole plug of one aspect of the present disclosure includes: a tube-shaped outer peripheral wall configured to be inserted into an attachment hole formed in an attachment-target member; a blocking portion that spans across an inside of the outer peripheral wall so as to close off the inside of the outer peripheral wall; a ring-shaped flange that juts out toward a radial direction outer side of the outer peripheral wall from an end portion of the outer peripheral wall on an opposite side from an insertion direction so as to cover a location surrounding the attachment hole; a hook portion that projects toward the radial direction outer side from an insertion direction end portion side of the outer peripheral wall so as to engage with an edge of the attachment hole; and a plurality of recess portions that are formed at a front face of a base end portion of the flange at intervals around a circumferential direction of the flange, each of the recess portions including a bottom portion with a planar face profile or a curved face profile.

Advantageous Effects of Invention

The present disclosure is capable of providing a hole plug capable of reducing the force required to insert the hole plug into an attachment hole formed in an attachment-target member.

DESCRIPTION OF SPECIFIC EMBODIMENTS OF THE INVENTION

Explanation follows regarding a hole plug 20 according to an exemplary embodiment of the present disclosure, with reference to FIG. 1 to FIG. 7.

The hole plug 20 of the present exemplary embodiment is a member used to close off an attachment hole formed in a plate-shaped section of an attachment-target member. Note that the arrow X illustrated in some of the drawings of FIG. 1 to FIG. 7 represents an insertion direction of the hole plug 20 (hereafter referred to as the "plug insertion direction" as appropriate), the arrow Y represents a radial direction of the hole plug 20 (hereafter referred to as the "plug radial direction" as appropriate), and the arrow Z represents a circumferential direction of the hole plug 20 (hereafter referred to as the "plug circumferential direction" as appropriate). The reference numeral CL represents a center line of the hole plug 20. Note that the plug radial direction inner side refers to the side closer to the center line CL in the plug radial direction, and the plug radial direction outer side refers to the side further from the center line CL in the plug radial direction.

Figure 7:
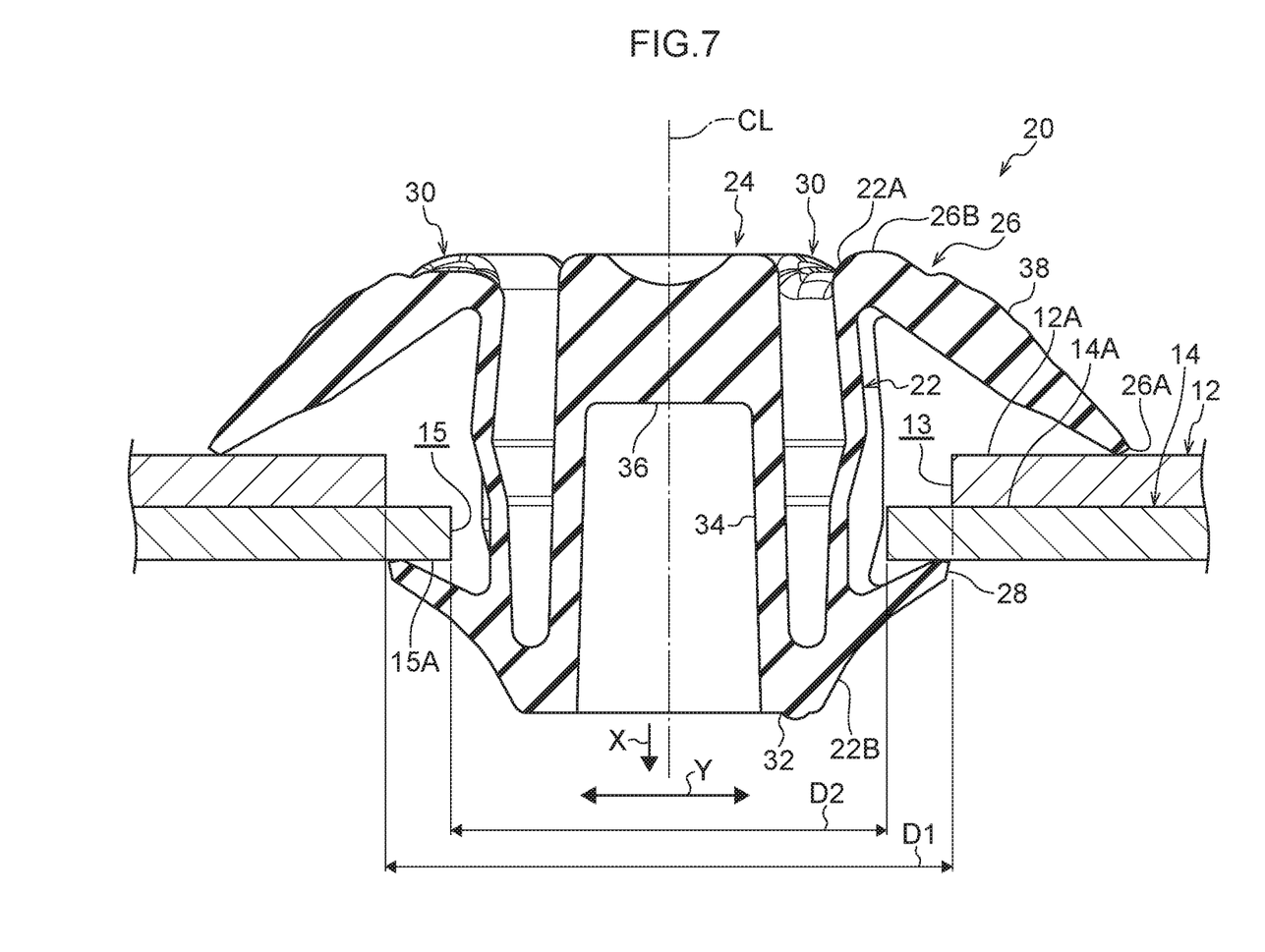
FIG. 7 is a cross-section (a cross-section corresponding to FIG. 3) of the hole plug illustrated in FIG. 1, illustrating a state in which the hole plug has been inserted into attachment holes in two overlapping panel members.

As illustrated in FIG. 7, the hole plug 20 configured to be attached to an attachment-target member 12 and an attachment-target member 14.

The attachment-target member 12 includes a plate-shaped section 12A, and a through hole 13 is formed through the plate-shaped section 12A. The through hole 13 is larger in diameter than a through hole 15 formed through the attachment-target member 14, described below. Specifically, a diameter D1 of the through hole 13 is larger than a diameter D2 of the through hole 15. Note that the attachment-target member 12 is for example a panel member of a vehicle (for example a body panel).

The attachment-target member 14 includes a plate-shaped section 14A, and the through hole 15 is formed through the plate-shaped section 14A. The attachment-target member 14 is attached to the attachment-target member 12 in a state in which the through hole 15 is aligned with the through hole 13 in the attachment-target member 12. The attachment-target member 14 is for example a bracket attached to the panel member of the vehicle.

The attachment-target member 14 of the present exemplary embodiment is an example of an attachment-target member of the present disclosure, and the through hole 15 is an example of an attachment hole in an attachment-target member of the present disclosure.

In the present exemplary embodiment, in a state in which a hook portion 28, described later, of the hole plug 20 has engaged with an edge 15A of the through hole 15 in the attachment-target member 14 (the state illustrated in FIG. 7), a flange 26, described later, covers the attachment-target member 12 up to a location surrounding the through hole 13.

Figure 1:
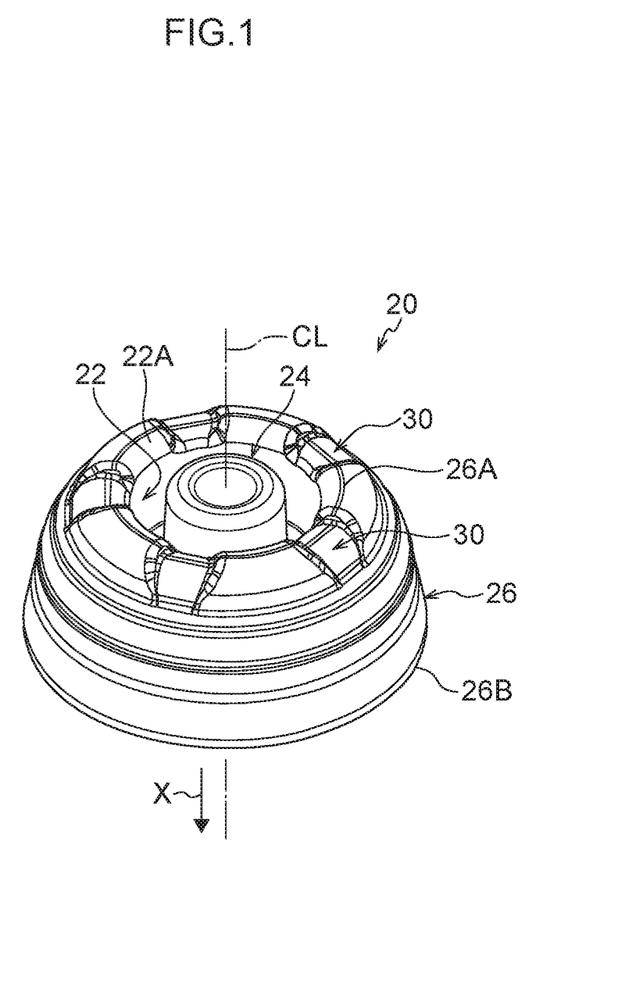
FIG. 1 is a perspective view of a hole plug according to an exemplary embodiment of the present disclosure, as viewed obliquely from above.
Figure 2:
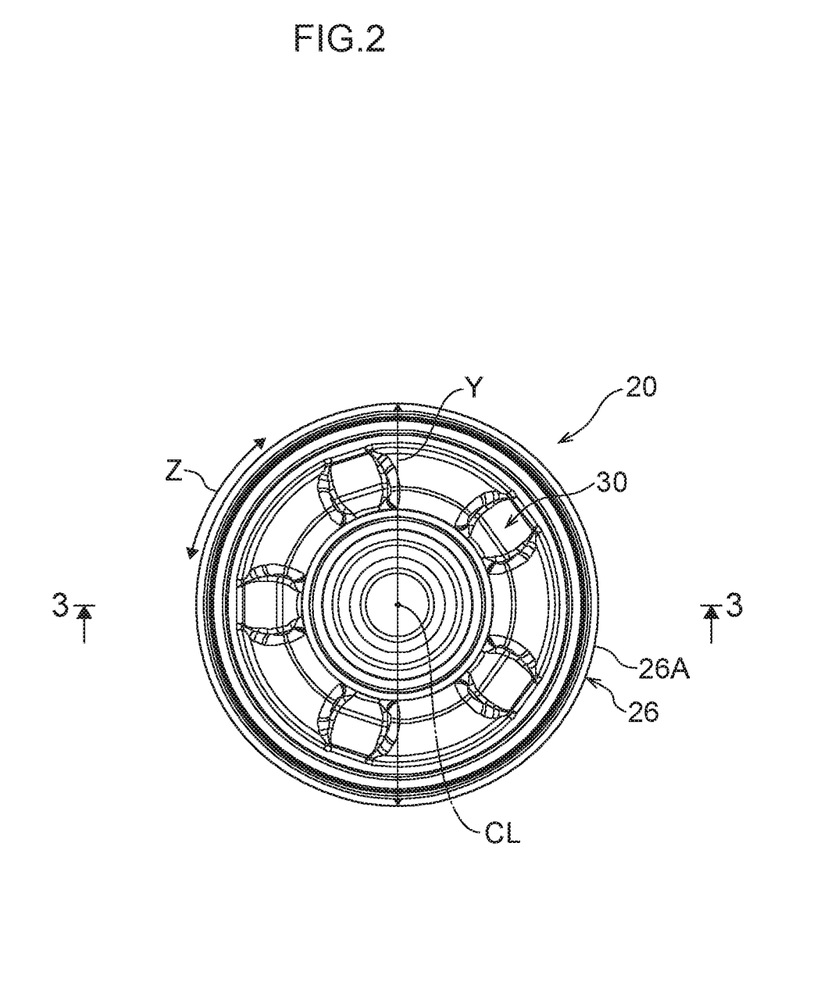
FIG. 2 is a plan view of the hole plug illustrated in FIG. 1.
Figure 3:
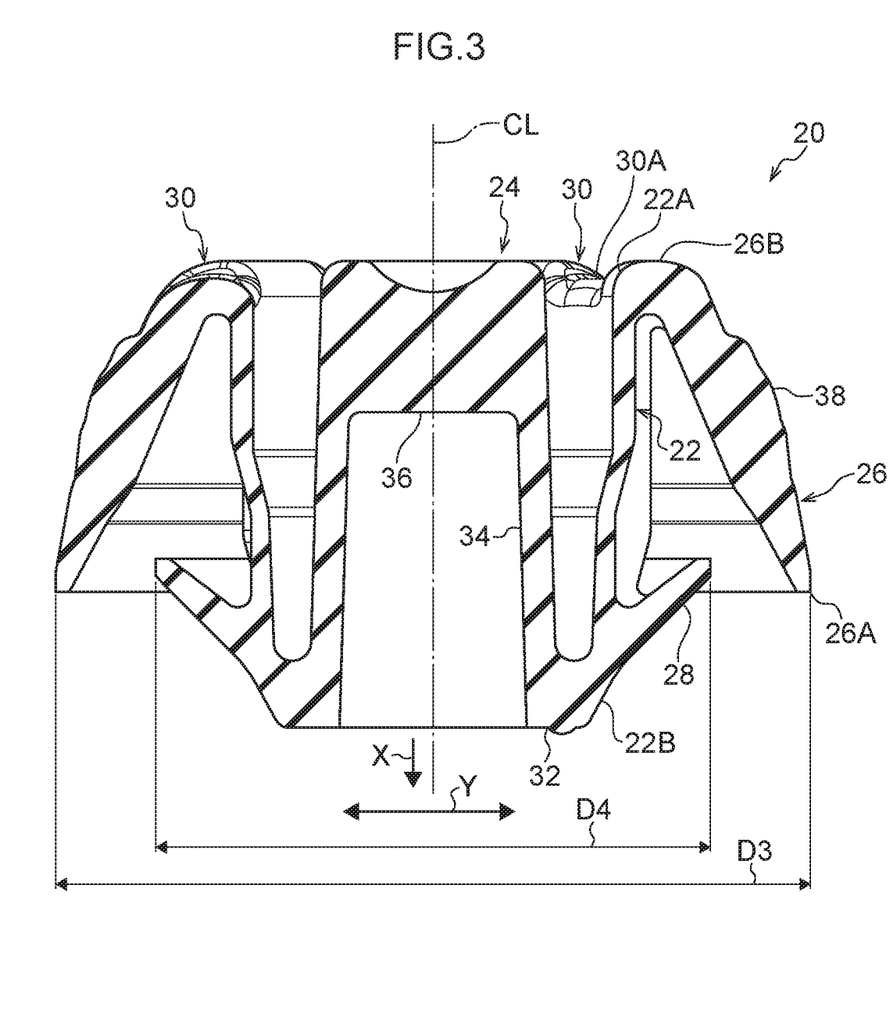
FIG. 3 is a cross-section of the hole plug illustrated in FIG. 2, as sectioned along line 3-3.

As illustrated in FIG. 1 to FIG. 3, the hole plug 20 includes an outer peripheral wall 22, a blocking portion 24, the flange 26, the hook portion 28, and grooves 30. Note that the hole plug 20 of the present exemplary embodiment is an integrally molded component configured from an elastically deformable resin.

As illustrated in FIG. 3 and FIG. 7, the outer peripheral wall 22 has a tube shape (a circular tube shape in the present exemplary embodiment), and is configured to be inserted into the through hole 13 in the attachment-target member 12 and the through hole 15 in the attachment-target member 14. Note that in the present exemplary embodiment, a circular tube shape encompasses shapes with both perfectly circular and elliptical cross-section profiles. Moreover, in the present exemplary embodiment, a circular ring shape encompasses both perfect circles and ellipses.

As illustrated in FIG. 2 and FIG. 3, the blocking portion 24 spans the inside of the outer peripheral wall 22 so as to block off the inside of the outer peripheral wall 22. Thus, in an engaged state in which the hook portion 28 of the hole plug 20 has engaged with the edge 15A of the through hole 15 in the attachment-target member 14 (hereafter referred to as the "hook portion engaged state" as appropriate), the through hole 15 is closed off by the blocking portion 24. The blocking portion 24 includes a circular ring shaped lip 32 that juts out toward the plug radial direction inner side from a plug insertion direction end portion 22B of the outer peripheral wall 22, a circular tube shaped inner peripheral wall 34 that extends in the opposite direction to the plug insertion direction from an inner peripheral end portion of the lip 32, and a face plate 36 that spans across inside an end portion of the inner peripheral wall 34 on the opposite side of the inner peripheral wall 34 to the plug insertion direction.

As illustrated in FIG. 1 and FIG. 3, the flange 26 juts out toward the plug radial direction outer side from an end portion 22A of the outer peripheral wall 22 on the opposite side of the outer peripheral wall 22 to the plug insertion direction. The flange 26 is formed in a ring shape (a circular ring shape in the present exemplary embodiment). In an unladen state, a diameter D3 of a leading end portion 26A of the flange 26 of the present exemplary embodiment is a larger diameter than the diameter D1 of the through hole 13 in the attachment-target member 12. Thus, in the engaged state in which the hook portion 28 of the hole plug 20 has engaged with the edge 15A of the through hole 15 in the attachment-target member 14, a location surrounding the through hole 15 in the attachment-target member 14 and the location surrounding the through hole 13 in the attachment-target member 12 are covered by the flange 26 (see FIG. 7).

The flange 26 of the present exemplary embodiment is formed with a ridge portion 38 at a front face of an intermediate portion between the leading end portion 26A and a base end portion 26B of the flange 26. The ridge portion 38 has a greater thickness than the leading end portion 26A and the base end portion 26B of the flange 26.

As illustrated in FIG. 3, the hook portion 28 projects from the plug insertion direction end portion 22B side of the outer peripheral wall 22 toward the plug radial direction outer side and in the opposite direction to the plug insertion direction. The hook portion 28 is formed continuously around the outer periphery of the outer peripheral wall 22 so as to have a circular ring shape. In the unladen state, a diameter D4 at a leading end of the hook portion 28 is a larger diameter than the diameter D2 of the through hole 15. Note that during insertion of the hole plug 20 (outer peripheral wall 22) into the through hole 15, an outer peripheral face of the hook portion 28 abuts an inner peripheral face of the through hole 15, such that the hook portion 28 deforms in a diameter-reducing direction. When the hook portion 28 in this reduced diameter state emerges from the through hole 15, the hook portion 28 returns to its original state. Since the diameter D4 at the leading end of the hook portion 28 is larger than the diameter D2 of the through hole 15, if force acts on the hole plug 20 in a direction to remove the hole plug 20 from the through hole 15 (in the opposite direction to the insertion direction), the hook portion 28 engages with (abuts) the edge 15A of the through hole 15, thereby limiting movement of the hole plug 20 in this removal direction (see FIG. 7).

Figure 5:
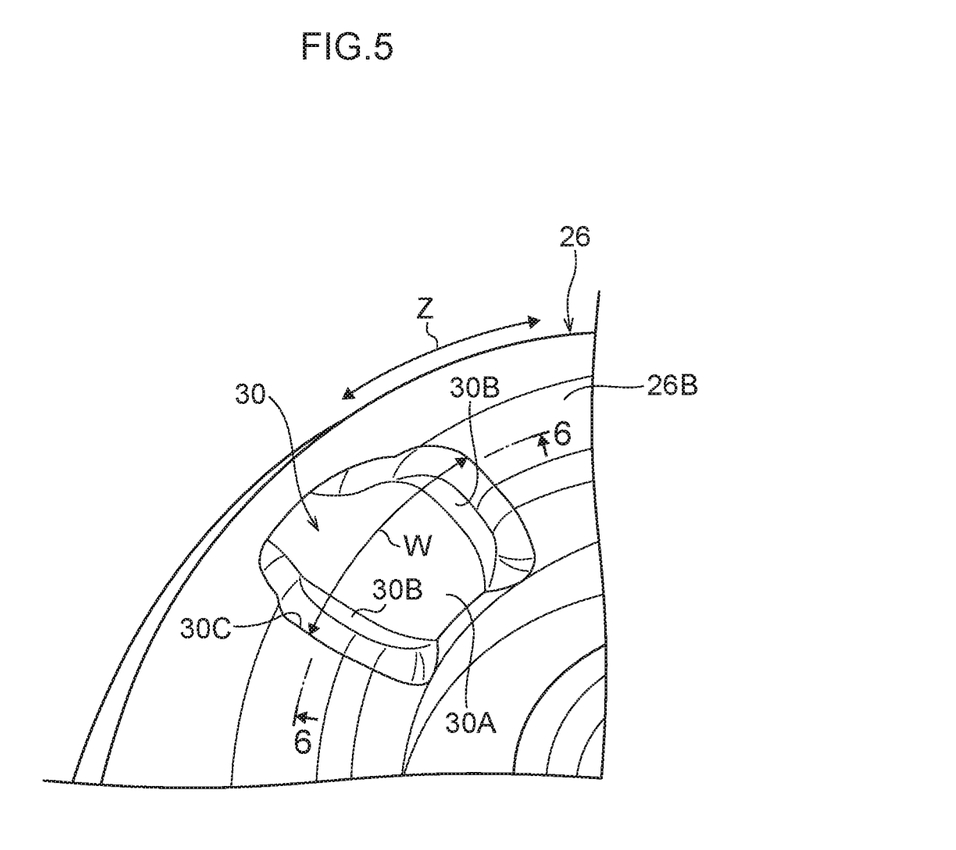
FIG. 5 is an enlarged view of a groove formed in the hole plug illustrated in FIG. 1.

As illustrated in FIG. 1 and FIG. 2, the front face of the base end portion 26B of the flange 26 is formed with plural of the grooves 30 at intervals around the plug circumferential direction (this being the same direction as the circumferential direction of the flange 26). As illustrated in FIG. 3 and FIG. 5, the grooves 30 extend from the outer peripheral wall 22 toward the flange 26. Specifically, the grooves 30 are formed so as straddle between the end portion 22B of the outer peripheral wall 22 and the base end portion 26B of the flange 26. Note that the grooves 30 of the present exemplary embodiment are an example of recess portions of the present disclosure.

Figure 4:
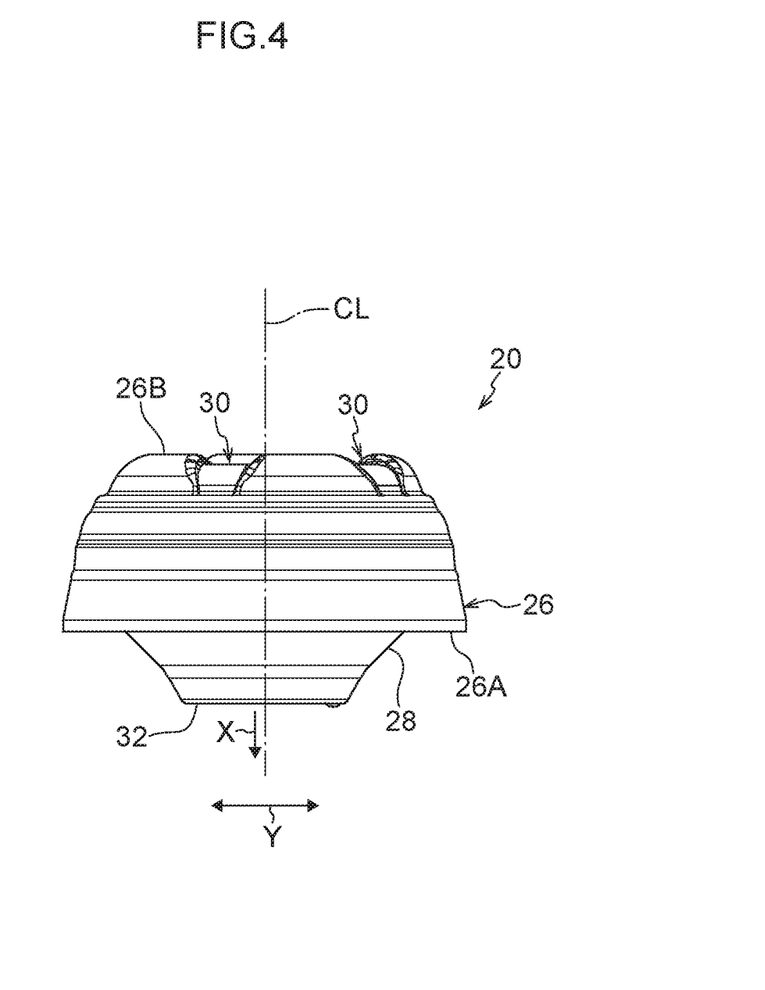
FIG. 4 is a side view of the hole plug illustrated in FIG. 1.
Figure 6:
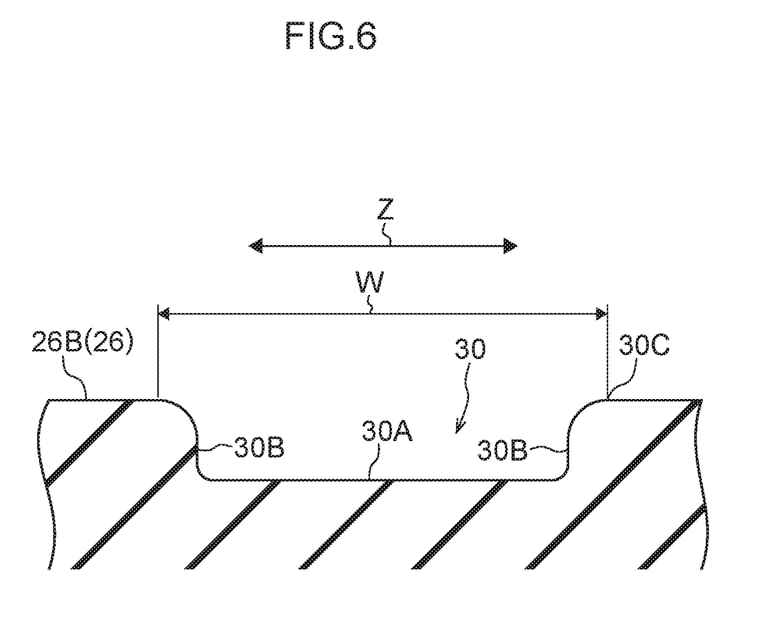
FIG. 6 is a cross-section of a groove in the hole plug illustrated in FIG. 5, as sectioned along line 6-6.

As illustrated in FIG. 4 to FIG. 6, a bottom portion 30A of each of the grooves 30 has a planar face profile. Note that the thickness of the hole plug 20 is thinner at locations formed with the grooves 30.

As illustrated in FIG. 6, a groove width W of the grooves 30 is greater at an opening 30C side than at the bottom portion 30A. Note that the "groove width W of the grooves 30" refers to the length of the grooves 30 as measured in the plug circumferential direction.

Moreover, an opening width of the grooves 30 is greatest at the base end portion 26B of the flange 26. Note that the "opening width of the grooves 30" refers to the groove width at the opening 30C of the groove 30.

As illustrated in FIG. 2, in the present exemplary embodiment five of the grooves 30 are formed in the front face of the base end portion 26B of the flange 26 at uniform intervals around the plug circumferential direction.

In the present exemplary embodiment, the groove width W is set such that side wall portions 30B of the grooves 30 do not abut each other, even in a state in which the flange 26 has been deformed so as to run parallel to the plug radial direction.

Next, explanation follows regarding operation and advantageous effects of the hole plug 20 of the present exemplary embodiment.

In the hole plug 20, the outer peripheral wall 22 is inserted into the through hole 13 and the through hole 15 while pressing on the face plate portion 36 of the blocking portion 24. Once the outer peripheral wall 22 has been inserted into the through hole 15 by a predetermined amount, the hook portion 28 recovers and engages with the edge 15A of the through hole 15 as previously described. The hole plug 20 is thereby prevented from coming out of the through hole 15. In the engaged state of the hook portion 28, the outer peripheral wall 22 and the blocking portion 24 close off the through hole 15 and the flange 26 covers the location surrounding the through hole 15 in the attachment-target member 14 and the location surrounding the through hole 13 in the attachment-target member 12. The hole plug 20 thereby hides the through hole 15 and the through hole 13 and also prevents water ingress.

In the hole plug 20, the plural grooves 30 are formed in the front face of the base end portion 26B of the flange 26, such that when the flange 26 abuts the location surrounding the through hole 13 during insertion, the flange 26 undergoes deformation originating at these grooves 30. As the flange 26 deforms in this manner, force in a diameter-widening direction acts on the leading end portion 26A, while force in a diameter-reducing direction acts on the base end portion 26B as a result of the force applied to insert the hole plug 20. In particular, a large external force acts on the front face of the base end portion 26B of the flange 26, and stress resisting this external force increases. However, due to forming the grooves 30 in the front face of the base end portion 26B, the grooves 30 provide an outlet for deformation in response to the external force, thereby relieving this stress. Thus, due to forming the grooves 30 in the front face of the base end portion 26B, the flange 26 more readily undergoes deformation originating at the grooves 30, reducing the force required to insert the hole plug 20 into the through holes.

Moreover, in the hole plug 20 the grooves 30 extend from the outer peripheral wall 22 toward the flange 26, such that stress is relieved not only at the front face side of the base end portion 26B where excessive stress could occur due to deformation of the flange 26, but also at surrounding locations. The force required to insert the hole plug 20 into the through hole is thereby further reduced. Furthermore, since the grooves 30 extend from the outer peripheral wall 22 toward the flange 26, the diameter of the base end portion 26B of the flange 26 is able to contract. Specifically, the base end portion 26B can be made to approach the center line CL illustrated in FIG. 7.

Moreover, in the hole plug 20 the grooves 30 extend from the outer peripheral wall 22 toward the flange 26, such that stress is relieved not only at the front face side of the base end portion 26B where excessive stress could occur due to deformation of the flange 26, but also at surrounding locations. The force required to insert the hole plug 20 into the through hole is thereby further reduced. Furthermore, since the grooves 30 extend from the outer peripheral wall 22 toward the flange 26, the diameter of the base end portion 26B of the flange 26 is able to contract. Specifically, the base end portion 26B can be made to approach the center line 26 illustrated in FIG. 7.

In the hole plug 20, the opening width of the grooves 30 is greatest at the base end portion 26B of the flange 26. Thus, the side wall portions 30B of the groove 30 are even less liable to abut each other at the front face side of the base end portion 26B where excessive stress could occur due to deformation of the flange 26. Moreover, the groove width W of the grooves 30 is greater on the opening 30C side than at the bottom portion 30A. Thus, the side wall portions 30B of the respective grooves 30 are less liable to abut each other during deformation of the flange 26 than for example in configurations in which the groove width W of the groove 30 is the same on the opening 30C side as at the bottom portion 30A, or is smaller on the opening 30C side than at the bottom portion 30A. By thus making the side wall portions 30B of the each of the grooves 30 less liable to abut each other, the flange 26 can be made to deform so as to become closer to being parallel to the plug radial direction, enabling attachment to be accommodated over a greater range of permissible plate thicknesses.

Moreover, in the hole plug 20, the grooves 30 are formed at the flange 26 at uniform intervals around the plug circumferential direction. Thus, the flange 26 can be made to deform (spread) in a well-balanced manner about the circumferential direction during deformation of the flange 26 originating at the plural grooves 30. Furthermore, five of the grooves 30 are formed in the flange 26, namely, the grooves 30 are formed at angle intervals of no greater than 72 degrees about the center line CL. Thus, the flange 26 can be made to deform (spread) in a more well-balanced manner about the plug circumferential direction compared for example to in configurations in which four or fewer grooves are formed, namely in which the grooves are formed at angle intervals of 90 degrees or greater.

Other Exemplary Embodiments

Figure 8:
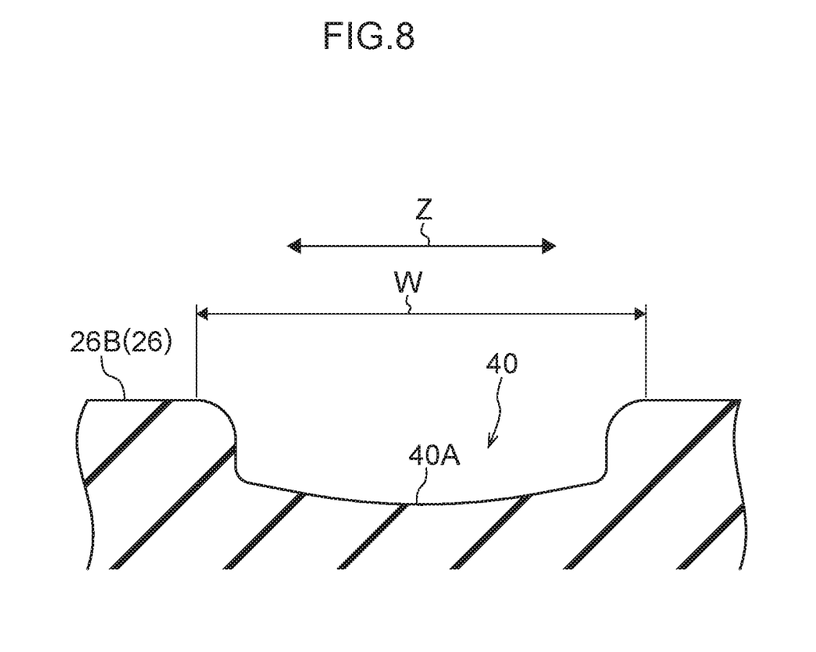
FIG. 8 is a cross-section (a cross-section corresponding to FIG. 6) of a groove formed in a hole plug according to another exemplary embodiment of the present disclosure.

As illustrated in FIG. 6, although the bottom portions 30A of the grooves 30 are formed with planar face profiles in the exemplary embodiment described above, the present disclosure is not limited to this configuration. For example, as illustrated in FIG. 8, a bottom portion 40A of a groove 40 may be formed with a curved face profile. In such cases, the advantageous effect of reducing the force required to insert the hole plug into the through hole is obtained similarly to in the exemplary embodiment described above. Moreover, forming the bottom portion 40A of each of the grooves 40 with a curved face profile enables stress to be suppressed from concentrating at the bottom portion 40A during deformation of the flange 26.

Although the grooves 30 are formed in the front face of the base end portion 26B of the flange 26 so as to extend from the outer peripheral wall 22 toward the flange 26 in the exemplary embodiment described above, the present disclosure is not limited to this configuration. For example, a configuration may be applied in which circular or polygonal recess portions are formed at the front face of the base end portion 26B of the flange 26.

Although the opening width of the grooves 30 is greatest at the base end portion 26B of the flange 26 in the exemplary embodiment described above, the present disclosure is not limited to this configuration. For example, a configuration may be applied in which the opening width of the grooves 30 is uniform from one end to the other end of the grooves 30.

Although five of the grooves 30 are formed at the flange 26 in the exemplary embodiment described above, the present disclosure is not limited to this configuration. For example, six or more of the grooves 30 may be formed.

Although the hook portion 28 projects from the end portion 22B side of the outer peripheral wall 22 (further toward the end portion 22B side than the plug insertion direction center of the outer peripheral wall 22) in the exemplary embodiment described above, the present disclosure is not limited to this configuration. For example, the hook portion 28 may project from the end portion 22B of the outer peripheral wall 22.

Although the hook portion 28 is formed in a circular ring shape in the exemplary embodiment described above, the present disclosure is not limited to this configuration. A configuration may be applied in which plural of the hook portions 28 are formed at an outer peripheral face of the outer peripheral wall 22 at intervals around the plug circumferential direction.

Although the through hole 13 in the attachment-target member 12 and the through hole 15 in the attachment-target member 14 are closed off by the hole plug 20 in the exemplary embodiment described above, the present disclosure is not limited to this configuration. For example, a configuration may applied in which a through hole in a single attachment-target member (for example a panel member) is closed off by the hole plug 20, or a configuration may be applied in which respective through holes in three or more attachment-target members are closed off by the hole plug 20.

Although an exemplary embodiment of the present disclosure has been described above, the present disclosure is not limited to the above description, and obviously various other modifications may be implemented within a range not departing from the spirit of the present disclosure.

The following supplementary explanation is also disclosed in relation to the above exemplary embodiment.

Supplement 1

A hole plug including:

a tube-shaped outer peripheral wall configured to be inserted into an attachment hole formed in an attachment-target member;

a blocking portion that spans across an inside of the outer peripheral wall so as to close off the inside of the outer peripheral wall;

a ring-shaped flange that juts out toward a radial direction outer side of the outer peripheral wall from an end portion of the outer peripheral wall on an opposite side from an insertion direction so as to cover a location surrounding the attachment hole;

a hook portion that projects toward the radial direction outer side from an insertion direction end portion side of the outer peripheral wall so as to engage with an edge of the attachment hole; and a plurality of recess portions that are formed at a front face of a base end portion of the flange at intervals around a circumferential direction of the flange, each of the recess portions including a bottom portion with a planar face profile or a curved face profile.

When attaching the hole plug of Supplement 1 to the attachment hole in the attachment-target member, the outer peripheral wall is inserted into the attachment hole while pressing on the blocking portion. Once the outer peripheral wall has been inserted into the attachment hole, the hook portion engages with the edge of the attachment hole and the hole plug is thereby prevented from coming out of the attachment hole. In the engaged state of the hook portion, the outer peripheral wall and the blocking portion close off the attachment hole and the flange covers the location surrounding the attachment hole. The hole plug thereby hides the attachment hole and also prevents water ingress.

Note that in this hole plug, the plural recess portions are formed at the front face of the base end portion of the flange, such that when the flange abuts the location surrounding the attachment hole, the flange undergoes deformation originating at these recess portions. In other words, stress occurring due to deformation of the flange is relieved by the plural recess portions. Thus, the force required to insert the hole plug into the attachment hole is reduced compared for example to configurations in which recess portions are not formed at the front face of the base end portion of the flange.

In particular, the bottom portions of the recess portions have planar face profiles or curved face profiles in this hole plug. Thus, side wall portions of the respective recess portions are less liable to abut each other when the flange undergoes deformation originating at the recess portion compared for example to in configurations in which the groove bottom portions come to a point as in a V-shaped cross-section. The force required to insert the hole plug into the attachment hole is thus reduced more effectively than for example in configurations in which grooves with V-shaped cross-sections are formed in the front face of the base end portion of the flange.

Supplement 2

The hole plug of Supplement 1, wherein each of the recess portions is a groove that extends from the outer peripheral wall toward the flange.

In the hole plug of Supplement 2, each of the recess portions is a groove that extends from the outer peripheral wall toward the flange. Thus, stress is relieved not only at the front face side of the base end portion where excessive stress could occur due to deformation of the flange, but also at surrounding locations. The force required to insert the hole plug into the attachment hole is thereby further reduced.

Supplement 3

The hole plug of Supplement 2, wherein an opening width of each of the recess portions is greatest at the base end portion of the flange.

In the hole plug of Supplement 3, the opening width of each of the recess portions is greatest at the base end portion of the flange. Thus, the side wall portions of each of the recess portions are even less liable to abut each other at the front face side of the base end portion where excessive stress could occur due to deformation of the flange.

Supplement 4

The hole plug of any one of Supplements 1 to 3, wherein a width of each of the recess portions is greater on an open side of the recess portion than at the bottom portion.

In the hole plug of Supplement 4, the width of each of the recess portions is greater on the open side of the recess portion than at the bottom portion. Thus, the side wall portions of the respective recess portions are less liable to abut each other during deformation of the flange than for example in configurations in which the width of the recess portions is the same on the open side as at the bottom portion, or is smaller on the open side than at the bottom portion.

Supplement 5

The hole plug of any one of Supplements 1 to 4, wherein the recess portions are formed at the flange at uniform intervals around the circumferential direction.

In the hole plug of Supplement 5, the recess portions are formed at the flange at uniform intervals around the circumferential direction of the flange. Thus, the flange can be made to deform (spread) in a well-balanced manner about the circumferential direction during deformation of the flange originating at the plural recess portions.

Supplement 6

The hole plug of Supplement 5, wherein five or more of the recess portions are formed at the flange.

In the hole plug of Supplement 6, five or more of the recess portions are formed at the flange, namely, the recess portions are formed at angle intervals of no greater than 72 degrees about the center of the outer peripheral wall. Thus, the flange can be made to deform (spread) in a more well-balanced manner about the circumferential direction compared for example to configurations in which four or fewer recess portions are formed, namely in which the recess portions are formed at angle intervals of 90 degrees or greater.

The entire content of the disclosure of Japanese Patent Application No. 2017-25223 filed on Dec. 27, 2017 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

What is claimed is:

1. A hole plug comprising:
   a tube-shaped outer peripheral wall configured to be inserted into an attachment hole formed in an attachment-target member;
   a blocking portion that spans across an inside of the outer peripheral wall so as to close off the inside of the outer peripheral wall;
   a ring-shaped flange that juts out toward a radial direction outer side of the outer peripheral wall from an end portion of the outer peripheral wall on an opposite side from an insertion direction so as to cover a location surrounding the attachment hole;
   a hook portion that projects toward the radial direction outer side from an insertion direction end portion side of the outer peripheral wall so as to engage with an edge of the attachment hole; and
   a plurality of recess portions that are formed at a front face of a base end portion of the flange at intervals around a circumferential direction of the flange, each of the recess portions including a bottom portion with a planar face profile or a curved face profile;
   wherein each of the recess portions extends from an inner face of the end portion of the tube-shaped outer peripheral wall on the opposite side from the insertion direction toward the front face of the base end portion of the flange.

2. The hole plug of claim 1, wherein an opening width of each of the recess portions is greatest at the base end portion of the flange.

3. The hole plug of claim 1, wherein a width of each of the recess portions is greater at an open side of the recess portion than at the bottom portion.

4. The hole plug of claim 1, wherein the recess portions are formed at the flange at uniform intervals around the circumferential direction.

5. The hole plug of claim 4, wherein five or more of the recess portions are formed at the flange.

6. The hole plug of claim 1, wherein:
   the blocking portion includes a circular ring shaped lip that juts out toward a radial direction inner side of the outer peripheral wall from the end portion at the insertion direction side of the outer peripheral wall, a circular tube shaped inner peripheral wall that extends in the opposite direction to the insertion direction from an inner peripheral end portion of the lip, and a face plate that spans across inside an end portion of the inner peripheral wall on the opposite side of the inner peripheral wall to the insertion direction.

* * * * *